Jan. 28, 1958 H. E. MILLER 2,821,690
TROLLEY WIRE TAP AND CABLE CLAMP THEREFOR
Filed June 1, 1956
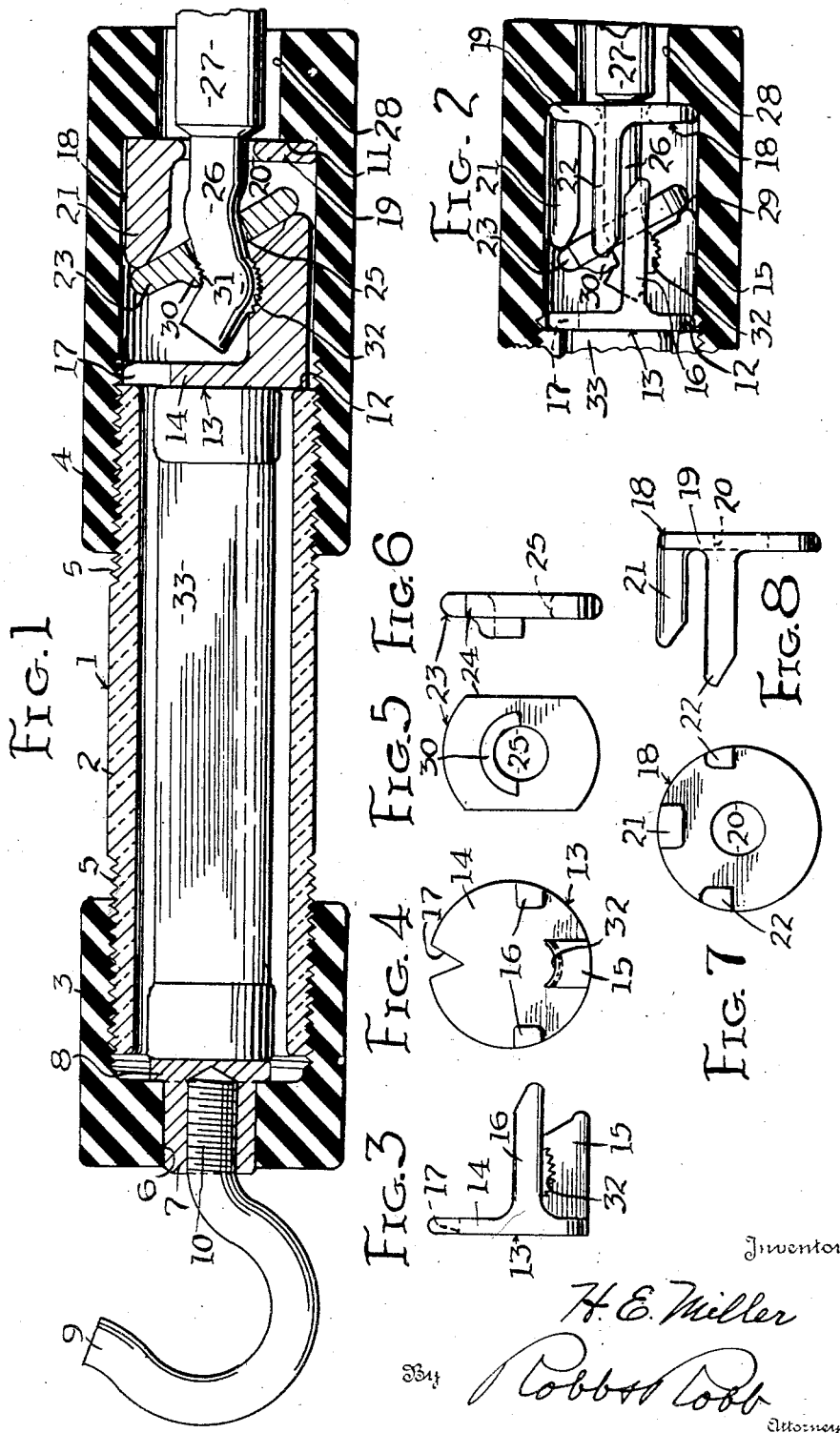
Inventor
H. E. Miller
By Cobb & Cobb
Attorneys

United States Patent Office 2,821,690
Patented Jan. 28, 1958

2,821,690

TROLLEY WIRE TAP AND CABLE CLAMP THEREFOR

Harry E. Miller, St. Albans, W. Va., assignor to Wallace M. Hale, St. Albans, W. Va.

Application June 1, 1956, Serial No. 588,720

12 Claims. (Cl. 339—109)

The present invention relates to trolley wire taps, and more particularly to a trolley wire tap having improved means for securing an electric cable to one end of the tap.

In the use of trolley wire taps or feeder taps in the mining and other industries, problems have been encountered in the production of a tap which would stand up under hard and long usage. Frequently, difficulties are encountered in the use of prior taps in that the electrical cable for a mine car locomotive, coal cutting machine, or other electrical apparatus to which the tap is adapted to supply power, will pull out of the tap body. In other prior tap constructions, a strong connection of the power cable to the tap is provided, but the connection is exposed and endangers the user.

Accordingly, an object of the present invention is to provide a trolley wire tap with improved cable-clamping means which are concealed within a non-conductive housing so as to prevent a user from contacting a bare electrical connection, and which are so constructed as to readily and securely grip a cable end to produce a strong connection which will not separate under strain.

Another object of the invention is to provide an improved trolley wire tap of the aforementioned type, wherein the construction thereof is simple and relatively inexpensive, as well as one which eliminates the need of any tools to assemble the same or to attach it to a cable.

In accordance with the foregoing, it is a further object to provide a cable grip or wire terminal comprising a member having a cable-engaging jaw thereon, a shiftable pressure applying member through which the cable projects, and a washer or wedge-like member encircling the cable and adapted to be cocked or canted so as to press the cable into engagement with the jaw upon the application of pressure to the washer from the pressure-applying member.

Another object is to provide a cable-connector or anchor wherein the construction is such that strain on the cable tending to pull the cable out of the connector will tighten the connection.

Other objects and advantages of the invention will be hereinafter described or will become apparent to those skilled in the art, and the novel features thereof will be defined in the appended claims.

In the accompanying drawing:

Fig. 1 is a view in section taken longitudinally through an illustrative form of trolley wire tap embodying the present invention, with certain of the parts shown in elevation;

Fig. 2 is a fragmentary view in section, showing the improved cable clamp in elevation, with a cable end secured therein;

Fig. 3 is a detail view in side elevation of a cable clamp component having a cable gripping jaw thereon;

Fig. 4 is a view in end elevation of the component of Fig. 3;

Fig. 5 is a view in end elevation of a cooperative washer-like clamping element of the cable clamp;

Fig. 6 is a view in side elevation of the washer-like element of Fig. 5.

Fig. 7 is a view in end elevation of the pressure-applying member of the cable clamp; and Fig. 8 is a view in side elevation of the pressure-applying member of Fig. 7.

Like reference characters in the several views of the drawing and in the following description designate corresponding parts.

The present trolley wire tap comprises a housing or body generally designated 1, this housing including a central cylindrical shell 2 which is preferably composed of fibre glass, Micarta or other non-conductive material, and a pair of end closures or caps 3 and 4 which are preferably composed of hard rubber, Bakelite, Micarta, or other insulating material.

Preferably, the shell 2 is exteriorly screw-threaded at its opposite ends, as indicated at 5, 5, and the closures or caps 3 and 4 are interiorly threaded for screw-connection to the threaded ends 5, 5.

The closure or cap 3 at its outer end is provided with a central opening 6 therethrough in which is suitably mounted, as by a tight press fit, a bushing 7 of brass or other conductive material, this bushing 7 having an enlarged head 8 seated interiorly of the cap 3 for preventing dislocation of the bushing 7 and for providing a broad contact surface at its inner end, for a purpose which will hereinafter become more fully apparent. The bushing 7 is adapted to support a hook 9 or other suitable contact member which is quickly and detachably engageable with a trolley wire to pick up or tap off current therefrom. In this connection, in the illustrated embodiment, the shank of the hook 9 is threaded as at 10 for engagement with complemental threads in a central bore in the bushing 7.

At the other end of the central shell 2 and within the cap 4 is a novel cable clamping means, this clamping means being disposed between a shoulder 11 within the closure or cap 4 and an opposed shoulder 12 formed by the adjacent end of the central shell 2.

The cable clamping means includes a member 13 of brass or other conductive material having a circular disc-like end wall 14 which is adapted to abut with the shouler 12 just described. Projecting from one face of the end wall 14 of the member 13 is a longitudinally extended jaw 15 and a pair of opposed longitudinally extended guide fingers 16, 16. At a point diametrically opposite the jaw 15, the wall 14 of the member 13 is provided with a notch or depression 17 which extends radially inwardly beyond the inner periphery of the central shell 2.

Disposed for engagement with the shoulder 11 of the closure or cap 4 is a second cable clamping member 18 of brass or other conductive material and having a circular end wall 19, this wall 19 having a central opening 20 therethrough. Projecting from the inner face of the end wall 19 is a longitudinally extended pressure finger 21 which projects axially towards the member 13. The pressure applying member 18 is also provided with a pair of longitudinally extended guide fingers designated 22, 22 which are disposed in opposed but angularly displaced relation to the jaw 15 and the fingers 16, 16 of member 13.

Disposed between the members 13 and 18 is a further cable clamping element in the form of a washer-like element 23 of brass or other conductive material having its opposite side edges 24, 24 formed for engagement between the opposed pairs of guide fingers 16, 16 and 22, 22 on the members 13 and 18, respectively, as is best seen in Fig. 2. The washer-like element 23 has a central opening 25 therethrough, through which the free bared end 26 of an electrical cable 27 is adapted to extend, this cable 27 extending out of the trolley tap assembly through a central opening 28 in the outer end of the closure or cap 4.

In use, the cable 27 can be connected to a suitable piece of electrical apparatus, such as a mining locomotive, coal-cutting machine, drill, or the like (not shown).

In order to securely clamp the free end 26 of the cable 27 in the cable clamping means or terminal, the inner extremity of the pressure finger 21 is adapted to abut with the adjacent marginal portion of the washer-like element 23 incident to threaded adjustment of the closure or cap 4 on the central shell 2 towards the cable gripping member 13, while the diametrically opposite portion of the washer-like element 23 engages with the outer extremity of the clamping jaw 15 of the member 13 which provides a fulcrum point as at 29, so that the washer-like element 23 is caused to cock or cant about the fulcrum point 29. As a result, the washer-like element 23 will bite into and tightly engage the bared end 26 of the cable 27, causing the cable end 26 to be deformed (see Fig. 1, particularly) by virtue of the provision of a depression or cavity 32 in the jaw 15 into which the cable is forced and seated by the pressure of the washer-like element aforesaid. Preferably, the outer periphery of the closure or cap 4 is suitably roughened or knurled to facilitate manually gripping the same, so that substantial cable gripping pressure may be applied to the washer-like element 23 by manual rotation of the cap 4, without necessitating the use of wrenches or other tools on the tap.

In order to more positively grip the bared end 26 of the cable 27, the washer-like element 23 is provided with a projection 30 adjacent the opening 25 through the washer-like element 23 at one side of said opening, this projection 30 serving to aid in the deformation of the cable end 26 and preferably being provided with a roughened or serrated cable-engaging surface 31 to insure tight seating of the cable end in the depression or cavity 32 of the opposed jaw 15, the cable-engaging surface of this depression 32 also preferably being roughened or serrated. The guide fingers 16, 16 and 22, 22 previously referred to engage the opposite straight sides of the washer-like element and prevent rotation of the latter, thus maintaining the projection 30 on the washer-like element in proper relation to the depression 32 in the jaw 15 regardless of rotative movement of the clamping means as a whole.

Any strain on the cable 27 tending to pull the same from the cable clamping means will increase the effective pressure of pressure finger 21 on the washer-like element 23, thus causing the clamping means to grip the cable harder.

Suitable means are provided between the cable-connecting means or terminal just described and the bushing 7 previously referred to for completing an electrical connection between the cable 27 and the contact or hook 9, and as is customary in the field, this means preferably comprises a fuse 33 of any suitable type which is engaged at one end with the head 8 of the bushing 7 and at its other end with the member 13. In the event that the fuse blows out, the central shell 2 will be vented to the atmosphere through the notch 17 in the clamping member 13 at the cable connector end of the tap.

As will be apparent from the foregoing, the trolley tap hereof enables the rapid and easy connection of the cable 27 to a power supply line such as a trolley or the like, and does not require the use of any special tools such as wrenches, screw drivers, etc. to effect assembly or dissassembly thereof, but instead, these operations may be readily effected manually with a minimum of effort.

While the specific details of the invention have been herein shown and described, changes and alterations may be resorted to without departing from the spirit thereof as defined in the appended claims.

I claim:

1. In a trolley wire tap, comprising a non-conductive housing, contact means at one end of said housing for removably connecting the tap to an electric trolley wire, conductive cable gripping means at the other end of said housing for connecting the tap to an electric cable, and means in said housing for establishing electrical connection between said contact means and said cable gripping means, that improvement wherein the cable gripping means includes a jaw member, a pressure member disposed in spaced relation to said jaw member, with one of said members being movable towards and away from the other member, and a washer-like element intermediate said members and having an opening therethrough for axially receiving the cable aforesaid with the end of the cable overlapping upon the jaw member, said cable gripping members respectively having parts engageable with said washer-like element at opposite sides of the axis of the latter to cant the washer-like element responsive to movement of the movable member aforesaid towards the other member, and means on said housing for forcing one of said cable-gripping members towards the other to cant said washer-like element relatively to the axis of the cable end extending axially therethrough and thereby cause the latter to grip the cable in the opening therein and force the cable into gripping engagement between the canted washer and said jaw member.

2. A trolley wire tap as defined in claim 1, wherein said jaw member is provided with a depression for receiving the cable, and said washer-like element is provided with a projection thereon which is engageable with the cable to force the latter into said depression in the jaw member.

3. A trolley wire tap as defined in claim 1, wherein said jaw member and said pressure member are each provided with a guide finger projecting towards the other member at opposite sides of the washer-like element, and said washer-like element is disposed between said guide fingers.

4. A trolley wire tap as defined in claim 1, wherein the means for shifting one of the members of said cable gripping means towards the other member aforesaid is in the form of a closure cap adjustably mounted on said housing, said closure cap having a shoulder engageable with said shiftable cable gripping member for shifting the latter upon adjustment of said closure cap.

5. In a trolley wire tap, comprising a non-conductive housing, contact means at one end of said housing for removably connecting the tap to an electric trolley wire, conductive cable gripping means at the other end of said housing for connecting the tap to an electric cable, and means in said housing for establishing electrical connection between said contact means and said cable gripping means, that improvement wherein said housing is provided with an open end and a closure adjustably and removably mounted at said open end, said housing and said closure having opposed shoulders disposed in said housing, said cable gripping means being disposed between said shoulders and including a relatively stationary member engaged with the housing shoulder, a shiftable member engaged with the closure shoulder, and a washer-like element between said members, said washer-like element having an opening through which the cable aforesaid extends, one of said members having a gripping jaw thereon engageable with the end of the cable, said washer-like element having a projection thereon engageable with said cable, and said members having parts engageable with said washer-like element to cant the latter and force said projection into engagement with the cable end and deform the cable end into gripping engagement with said gripping jaw.

6. An electric wire terminal, comprising a wire gripping jaw member, a pressure member, means supporting said members in spaced relation to one another for movement of one of said members towards the other, a washer-like element between said members, said pressure member and said washer-like element having openings therethrough for permitting the terminal end of the wire to extend therethrough into engagement with said jaw member, said pressure member being engageable with said washer-like element adjacent to its outer margin at one side of the latter, and said jaw member being engageable with said washer-like element at the other side of the washer-like element for canting the latter and causing it to bite into the wire and grip the wire responsive to movement of one of said members towards the other.

7. An electric wire terminal as defined in claim 6, wherein said washer-like element is formed with a projection adjacent to the opening therethrough for forcing the wire towards said jaw member, and said jaw member is provided with a jaw having a depression for receiving the wire forced towards the same by said projection.

8. An electric wire terminal as defined in claim 6, wherein said pressure member is provided with a pair of opposed guide fingers respectively disposed at opposite sides of said washer-like element for retaining said washer-like element in an operative position.

9. An electric wire terminal as defined in claim 6, wherein said jaw member is provided with a pair of opposed guide fingers respectively disposed at opposite sides of said washer-like element for retaining said washer-like element in an operative position.

10. An electric wire terminal as defined in claim 6, wherein said pressure member and said jaw member are each provided with a pair of guide fingers respectively disposed at opposite sides of said washer-like element for retaining said washer-like element in an operative position, said guide fingers forming a cage for said washer-like element at opposite marginal edges thereof.

11. An electric wire terminal as defined in claim 6, wherein said pressure member and said jaw member are each provided with a pair of guide fingers respectively disposed at opposite sides of said washer-like element for retaining said washer-like element in an operative position, said guide fingers forming a cage for said washer-like element at opposite marginal edges thereof, the said washer-like element having opposite side edges formed in parallel relation and slidably engaged with said guide fingers to prevent rotation of said washer-like element.

12. A clamp for strand-like elements, comprising a gripping member having a jaw projecting therefrom, a pressure member disposed in spaced relation to the gripping member and having a pressure finger projecting towards the gripping member, means supporting said members in spaced relation for movement of one of said members towards and away from the other member, said members each having guide fingers projecting therefrom towards the other member, a washer-like element confined between said guide fingers and disposed between said jaw and said pressure finger, said washer-like element and one of said members each having an opening for permitting an end of a strand-like element to extend therethrough into engagement with the other of said members, with the strand-like element disposed for engagement with the jaw aforesaid, a projection on said washer-like element engageable with the strand-like element in opposed relation to said jaw, and means for shifting one of said members towards the other to cant said washer-like element responsive to pressure thereon from said pressure finger to engage said strand-like element with the projection on the washer-like element and force the strand-like element into engagement with said jaw.

References Cited in the file of this patent

UNITED STATES PATENTS

| | | |
|---|---|---|
| 2,182,896 | Hixon | Dec. 12, 1939 |
| 2,657,371 | Huston | Oct. 27, 1953 |